Dec. 1, 1959  W. E. ARNOLD  2,915,658
COMMUTATORS FOR DYNAMO-ELECTRIC MACHINES
Filed Oct. 6, 1955

INVENTOR
WILLIAM ELI ARNOLD
BY Paul M. Craig, Jr.
ATTORNEY

United States Patent Office 2,915,658
Patented Dec. 1, 1959

2,915,658

COMMUTATORS FOR DYNAMO-ELECTRIC MACHINES

William Eli Arnold, Ashtead, England

Application October 6, 1955, Serial No. 538,954

5 Claims. (Cl. 310—234)

The present invention relates to commutators for dynamo-electric machines having a wound rotor.

When a commutator is fitted to such a dynamo-electric machine the commutator is first slipped on to the armature shaft. The armature leads are then positioned in contact with the commutator segments and are attached thereto, often by dip-soldering. In this latter process, the axis of the rotor to which the commutator is affixed is held vertically with the commutator lowermost. The rotor is lowered into a bath of molten solder until the surface of the solder reaches the connections and soldering of the armature leads to the commutator segments is effected. In this case, substantially the whole of the commutator is immersed in the molten solder.

Impregnation of the armature leads with varnish follows at a later stage after which the commutator is finished, e.g. by turning on a lathe or by grinding to remove excess solder forming electrical bridges between the segments. Finally, in one method of commutator construction, saw cuts are made in the intersegment insulating material where its surface lies flush with the surface of the segments, and where, as is well-known, it is desirable for the outer surface of the intersegment insulating material to be recessed with respect to the commutator segments.

This saw-cutting is a costly operation and it has been appreciated for some time that it would be an advantage if the recessing between commutator segments could be carried out during the manufacture of the commutators.

Hitherto, when commutators made with undercut intersegment insulators have been assembled on rotors and soldered by dipping or other means, a serious difficulty has been encountered in that solder collects in the recesses causing short-circuits. The removal of this solder is tedious and there is a risk of leaving small particles of solder or other matter in the recesses which may cause subsequent electrical trouble. In addition, when the rotor is impregnated with varnish some of this varnish is also liable to collect in the recesses.

There are also methods of making commutators in which no insulating material is left between the segments. For example, commutators may be made by a method in which a tube or disc of metal is anchored to a moulded core by inwardly extending lugs or the like, the tube or disc being subsequently divided up into segments by saw-cutting. The saw cuts leave comparatively deep recesses which extend down to the moulded core and into which solder, varnish and dirt is liable to enter during the processes carried out in connection with the fitting of such a commutator on the shaft of a dynamo electric machine.

It is already known for electric motor manufacturers to fit a protective cap over the commutator prior to dip soldering, this cap being a loose fit on the commutator so as to enable it to be removed therefrom. Such a loose cap does not, however, guarantee prevention of solder running into the inter-segment recesses; and its removal is a difficult and inconvenient operation since the cap becomes very hot during dip soldering. The cap also has to be cleaned before being stored for re-use. Moreover, if the motor manufacturers produce a wide range of motors, it will be necessary for them to stock a number of caps of different sizes and shapes to suit different sizes and shapes of commutators.

It is also known to arrange above the solder bath a cap into which the commutator is inserted after being mounted on the motor shaft. In this case, either the cap is arranged so that it can be lowered together with the armature into the solder bath, or the solder bath is arranged so that it can be raised the required distance for effecting the dip-soldering operation. Both the arrangements necessitate the provision of a relatively complicated raising and lowering mechanism and, as in the previously described known method, it is desirable to provide different sizes and shapes of cap to suit different sizes and shapes of commutator. The substitution of one such cap for another is likewise a difficult and inconvenient operation.

The present invention has for its object to remove these disadvantages and with this object in view there is provided according to the present invention a commutator assembly comprising a commutator in which the intersegment insulators are shaped to provide intersegment recesses between the parts of the commutator segments constituting the commutator brush surface, and a thin mask or sheath of protective material fitted closely over the commutator so as to cover said intersegment recesses and the parts of the segments adjacent the sides and ends of said recesses, but leave parts at one end of said segments exposed for connection by dip soldering or the like to terminal wires of the windings of a dynamo-electric machine on which said commutator assembly is to be mounted.

The term "intersegment insulators," except where the context indicates otherwise, is to be interpreted to include not only separately formed intersegment insulating components but also parts of insulating material between adjacent segments which are integral with the commutator body.

The invention is illustrated by way of example with reference to the accompanying drawings, in which.

The same references are used to indicate like parts in all these figures.

Figure 1:
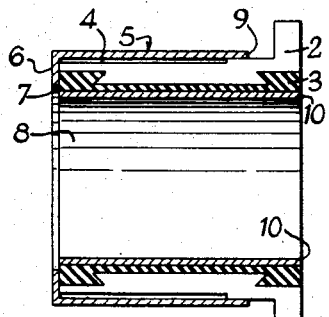
Fig. 1 is a vertical longitudinal section of a commutator fitted with a mask.
Figure 2:
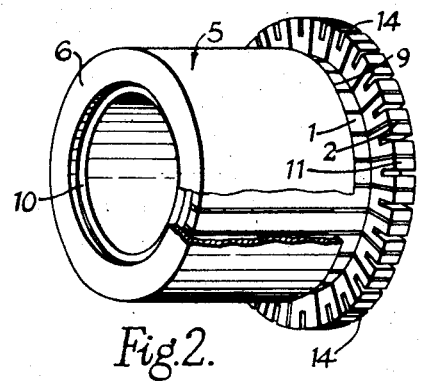
Fig. 2 is a perspective view of the commutator and mask shown in Fig. 1.

Referring to the drawings and particularly to Figs. 1 and 2, the commutator comprises an assembly of contact segments 1 and intersegment insulators 2 embedded in a moulded synthetic resin core 3 carried on a metal sleeve 10, the intersegment insulators 2 being shaped to provide intersegment recesses 4. Fitted tightly over this commutator is a sheath or cap of thin aluminium foil indicated generally by reference 5. The crown portion 6 of the cap 5 is formed with a circular opening 7 of slightly larger diameter than the interior bore 8 of the commutator, while the rim 9 thereof finishes a short distance away from the lugs 11 of the contact segments 1. The cap thus completely masks the intersegment recesses 4 and tightly grips the parts of the segment which contain them.

After the completed assembly consisting of the commutator and cap has been fitted over the rotor shaft 12 of an electric motor, the terminal wires 13 of the rotor windings are inserted into slots 14 provided in the lugs 11. The rotor is now tilted into a position in which the axis of its shaft 12 is vertical and the commutator lowermost, after which it is dipped in a bath (not shown) of molten solder to such a depth that the surface of the solder covers the terminal lugs. As a result of this operation, the ends of the terminal wires 13 in the slots 14 are soldered to the lugs 11.

In a subsequent operation, the rotor is treated with an electrically insulating varnish so as to impregnate the windings.

The cap 5, being made of aluminium foil, is not easily wetted by solder and effectively masks the brush surface of the commutator during the above-mentioned soldering and varnishing operations, so that no solder or varnish can become lodged in the intersegment recesses 4.

The mask is subsequently removed either by tearing it off or by turning it off on a lathe.

In order to enable the electrical insulation between the segments of the commutator to be tested while the cap 5 is in position, either this cap or the outside of the commutator or both may be given a coating of an electrically insulating varnish or synthetic resin. Any coating on the commutator is of course eventually removed after removing the cap 5.

Figure 3:
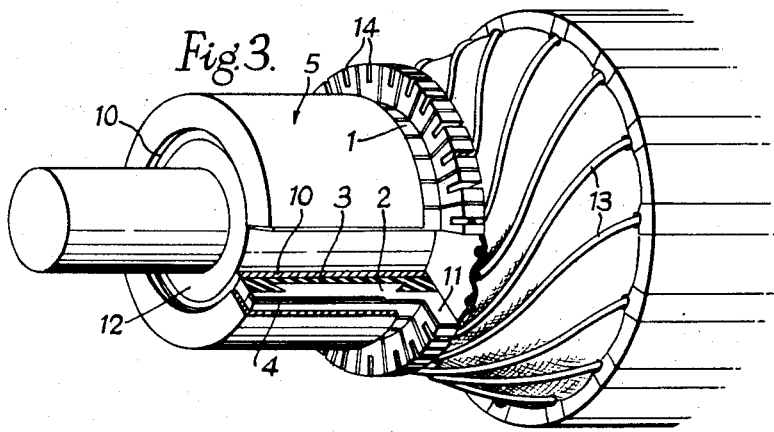
Fig. 3 is a fragmentary perspective view showing this commutator and mask assembled on the rotor shaft of an electric motor.
Figure 4:
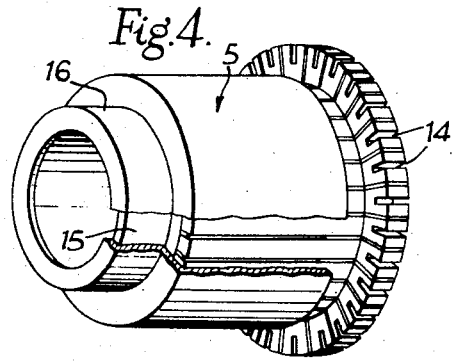
Fig. 4 is a view similar to Fig. 2 illustrating a modification.

Fig. 4 illustrates a modification in which the commutator is provided with a boss 15, but is otherwise similar to the commutator described with reference to Figs. 1 to 3. In this case, the cap 5 is extended as at 16 to cover this boss.

Figure 5:
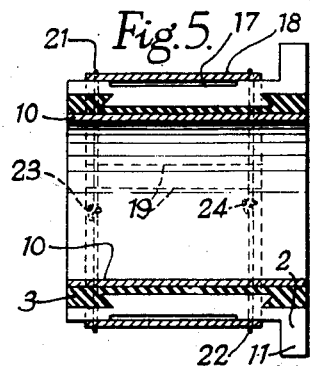
Fig. 5 is a section similar to Fig. 1 of a commutator fitted with a different form of mask.

Fig. 5 illustrates a modification in which the intersegment recesses 17 do not extend as far as that end of the commutator which is remote from the lugs 11. In this case, the mask consists of a strip 18 wound round the commutator with its ends overlapped as indicated in broken lines at 19. This strip is secured in position by binding elements or wires 21, 22 which are wound round its margins in positions beyond the ends of the recesses 17 at each extremity, respectively, of the brush surface and fastened by twisting their ends as indicated at 23, 24.

Among the advantages of the masks described above is that they offer protection to the copper segments against annealing in the solder bath. In the embodiment according to Figs. 1 to 3, where the mask extends over the front face of the commutator, all insulating material between the segments and the centre sleeve of the commutator is protected against the effects of solder dipping, mechanical damage or dirt until the cap is removed at the final stage of manufacture. In commutators made with a synthetic resin core, the cap thus extended is particularly valuable in reducing temperature effects such as blistering of the resinous material.

While aluminium foil is a particularly advantageous material for the masks for the reasons just mentioned, many other materials can be used instead, such as for example heavy fibrous materials which may, if desired, be impregnated with a synthetic resin. When using electrically nonconducting materials such as this, there is of course no need to coat the mask or the commutator in order to enable the latter to be tested electrically with the mask in position.

Although the embodiments of the invention described above and illustrated in the accompanying drawings all utilize drum type commutators, it will be appreciated that the invention is likewise applicable to "disc type" commutators i.e. to commutators in which the segments combine to form a disc with a brush surface on one face thereof.

Moreover, the invention is applicable to riveted type commutators as well as to moulded type commutators.

I claim:

1. A commutator assembly of a dynamo-electric machine, comprising a commutator of the kind having a plurality of metallic commutator segments electrically insulated from one another and arranged to provide an external commutator brush surface interrupted by intersegment recesses and supporting means for said segments formed with an interior bore coaxial with said brush surface in combination with a mask composed of an electrically non-conducting protective material fitted tightly over said commutator so as to cover completely said intersegment recesses and to engage in surface-to-surface contact with all those external parts of the commutator which border the sides and ends of said intersegment recesses, while at the same time leaving exposed the ends of said central bore and segment portions at one end of said segments.

2. A commutator assembly of a dynamo-electric machine, comprising a commutator of the kind having a plurality of metallic commutator segments electrically insulated from one another and arranged to provide an external commutator brush surface interrupted by intersegment recesses and supporting means for said segments formed with an interior bore coaxial with said brush surface in combination with a mask of protective material enclosing said commutator, a layer of electrically insulating material provided between the exterior surfaces of the commutator and the interior surfaces of the mask, said mask being fitted tightly over said layer and engaging in surface-to-surface contact with the external surface thereof and said mask and layer together being fitted tightly over said commutator so as to cover completely said intersegment recesses and to engage in surface-to-surface contact with all those external parts of the commutator which border the sides and ends of said intersegment recesses, while at the same time leaving exposed the ends of said central bore and segment portions at one end of said segments.

3. A commutator assembly according to claim 1, wherein said mask is composed of a heavy fibrous material.

4. A commutator assembly according to claim 1, wherein said mask is a pre-formed structure the interior surface of which is conformed with the surfaces of said external parts of the commutator around said intersegment recesses to fit tightly thereagainst.

5. A method of manufacturing a dynamo-electric machine rotor of the kind having a rotor shaft and rotor windings with terminal wires soldered to segments of a commutator mounted on said rotor shaft and provided with intersegment recesses in at least that circumferential part thereof which forms the commutator brush surface, comprising the steps of constructing said commutator as a separate component, applying over said commutator while it is still a separate component a mask of protective material which completely covers said intersegment recesses and is in surface-to-surface contact with all the external commutator surface parts bordering the sides and ends of said intersegment recesses but leaves parts of said segments at one end thereof exposed, said mask being composed of a preformed sheath of a metallic material which is substantially inert against wetting by solder and of a layer of an electrically insulating material between the interior surface of said sheath and said exterior commutator parts, testing the electrical insulation between the segments of the commutator, thereafter mounting said commutator fitted with said mask on said rotor shaft with said exposed parts adjacent the rotor windings, positioning the ends of said terminal wires against the exposed parts of said segments, dip soldering said terminal wire ends to said exposed segment parts and removing said mask from said commutator.

References Cited in the file of this patent

UNITED STATES PATENTS

| | | |
|---|---|---|
| 1,835,120 | Poole | Dec. 8, 1931 |
| 2,264,703 | Lenz | Dec. 2, 1941 |
| 2,326,022 | Everett | Aug. 3, 1943 |
| 2,476,937 | White | July 19, 1949 |

FOREIGN PATENTS

| | | |
|---|---|---|
| 29,030 | Great Britain | of 1913 |
| 512,765 | Belgium | July 31, 1952 |